Figure 8:
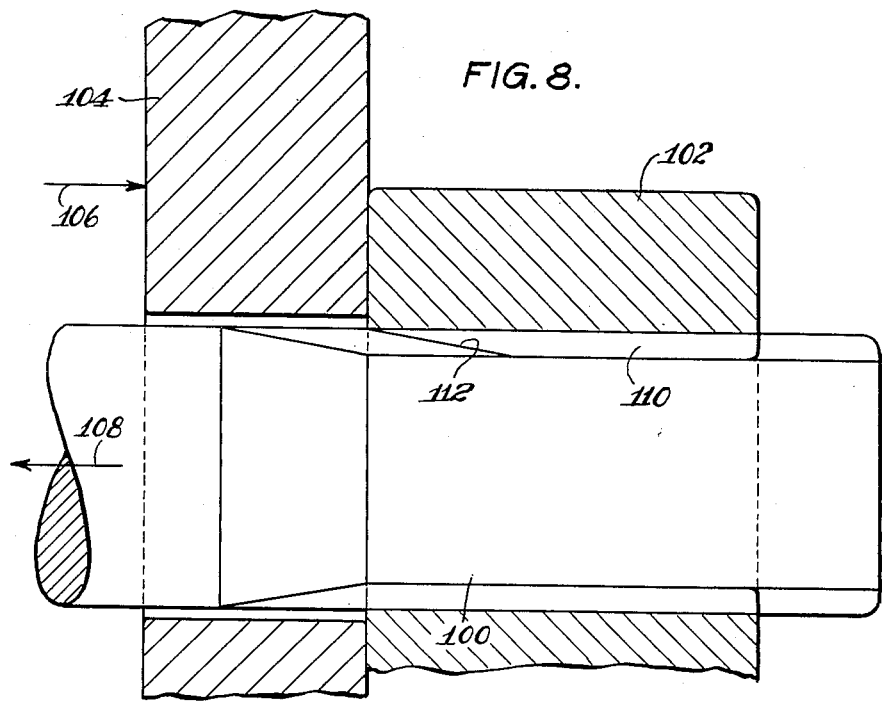

Dec. 19, 1939.  W. M. FRAME  2,183,644
THREADED JOINT AND APPARATUS FOR MAKING IT
Filed Dec. 27, 1938  4 Sheets-Sheet 1
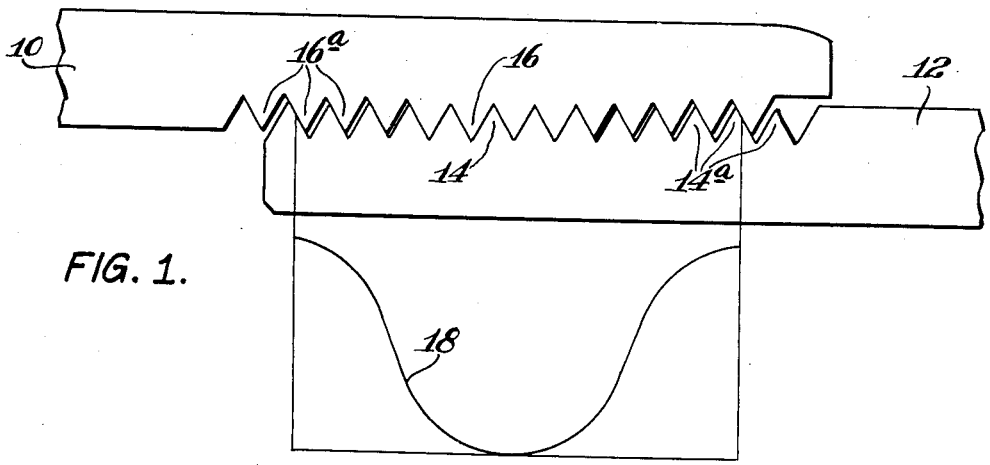
FIG. 1.
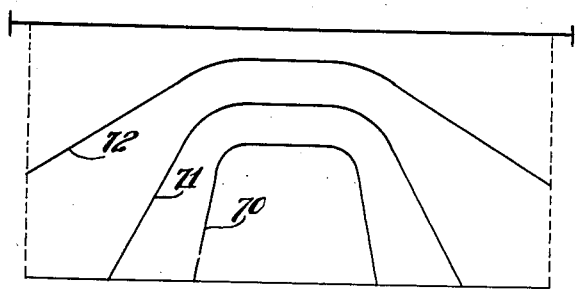
FIG. 5-A.
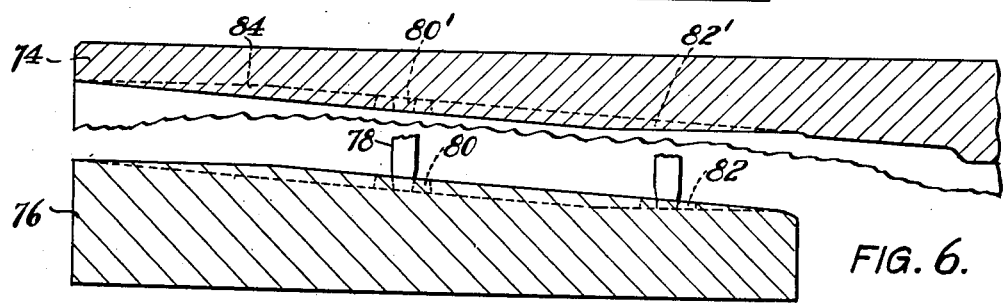
FIG. 6.
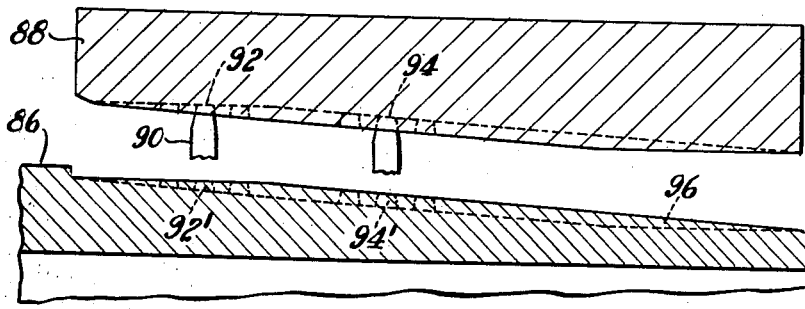
FIG. 7.
INVENTOR.
William M. Frame
BY Brown, Critchlow & Flick
his ATTORNEYS.

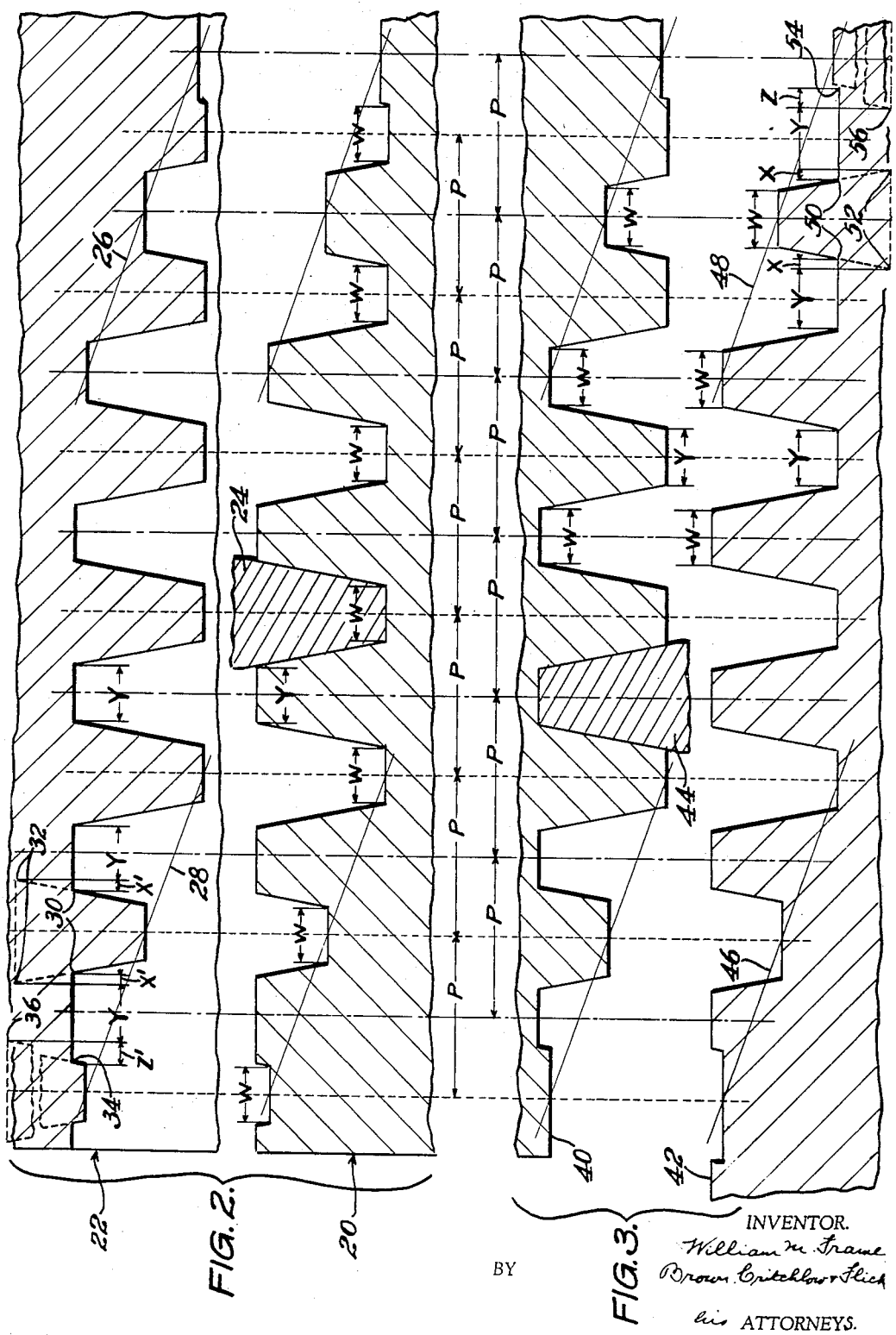

Dec. 19, 1939.　　　　W. M. FRAME　　　　2,183,644
THREADED JOINT AND APPARATUS FOR MAKING IT
Filed Dec. 27, 1938　　　4 Sheets-Sheet 3
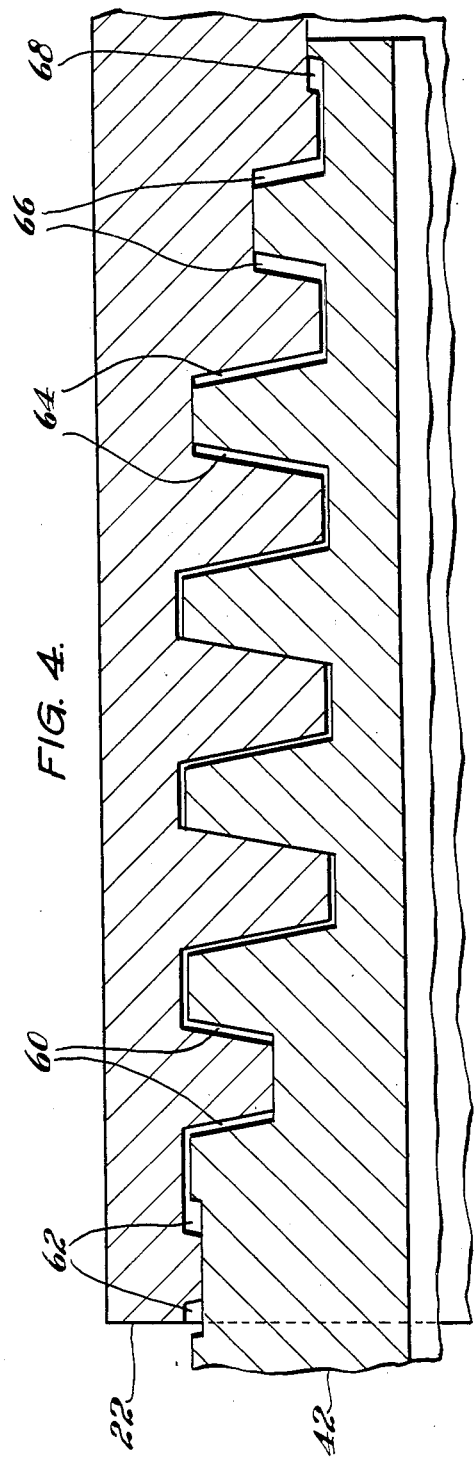
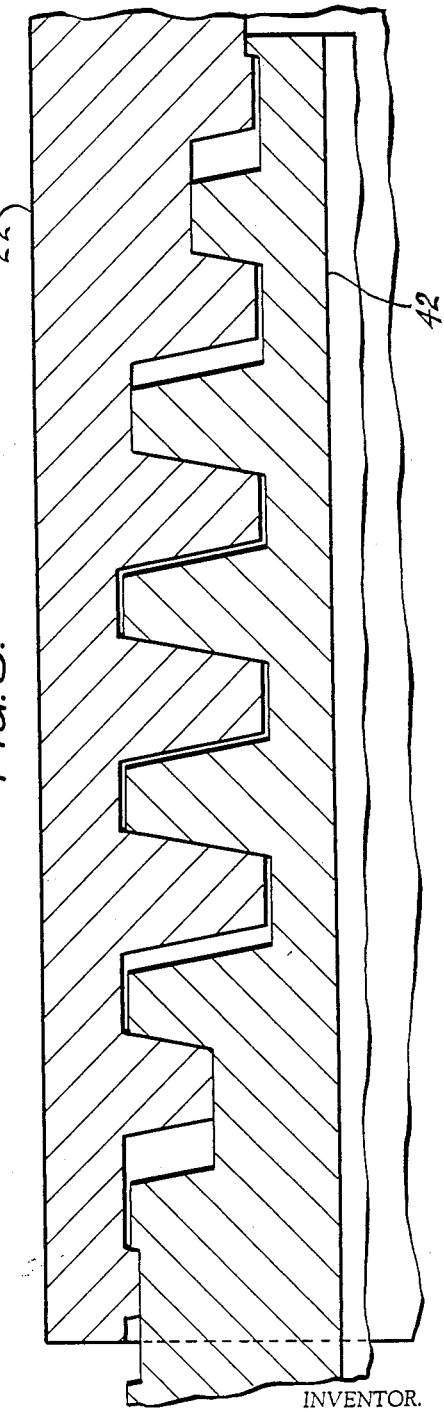
INVENTOR.
William M. Frame
BY Brown, Critchlow & Flick
his ATTORNEYS.

Dec. 19, 1939. W. M. FRAME 2,183,644
THREADED JOINT AND APPARATUS FOR MAKING IT
Filed Dec. 27, 1938 4 Sheets-Sheet 4

INVENTOR.
William M. Frame
BY Brown, Critchlow & Flick
his ATTORNEYS.

Patented Dec. 19, 1939

2,183,644

UNITED STATES PATENT OFFICE 2,183,644

THREADED JOINT AND APPARATUS FOR MAKING IT

William M. Frame, Ben Avon, Pa., assignor to The National Supply Company, Pittsburgh, Pa., a corporation of Pennsylvania Application December 27, 1938, Serial No. 247,782

4 Claims. (Cl. 10—101)

This invention relates to threaded joints and to improved methods for making them, and is more particularly concerned with joints, such as oil well rod, tube or casing joints, adapted to resist high axial tension and methods of making such joints.

In the manufacture and use of threaded joints, regardless of the particular type of thread form employed, it has been the standard practice to increase the size or length of the threads to increase the strength of the joint to better adapt it to resist axial tension. Often this practice is not feasible for the reason that the members carrying the threads are relatively thin walled, as in oil well casing or other tubular members, and furthermore increasing the length of the thread is likewise objectionable. Furthermore, in many types of threaded joints high axial pull results in radial distortion of the joint. For example, the standard American Petroleum Institute joint for oil well casing is subjected to radial forces tending to expand the female member and contract the male member when the joint is subjected to relatively heavy axial pull, as, for example, when the casing joint supports a string of oil well casing many thousands of feet long in an oil well. This radial expanding and contracting action is due to the fact that the engaging flanks of the Briggs or V threads of the standard A. P. I. joint are formed on an angle of 60° with the joint axis. Thus, when the joint is subjected to axial tension the inclined flank surfaces exert a wedging action on each other resulting in the radial stresses which in some instances have been known to cause the joint members to pull apart with very little damage to the threads that was apparent to the eye.

So far as I am aware, it has always been the assumption of the man skilled in the art that the individual threads of a threaded joint carry an equal load when the joint is subjected to axial pull. I have discovered that this is not a fact and that in a threaded joint including threaded complementary male and female members the thread convolutions near the ends of the joint carry the greatest load and that the thread convolutions inwardly of the ends carry a progressively lighter load, whereas the threads at the center of the joint may carry no load at all. I believe that this is due to the deformation of the complementary threads when under load. It will be recognized that the thread convolutions at the ends of the joints first receive the load, and it is only after they have deformed that the load is transmitted onto the thread convolutions inwardly of the joint. In this connection, it will be immediately evident that if the threaded length of a joint is increased to many times its normal length that when the joint is subjected to axial pull the threads near the end of the joint may be deformed both elastically and plastically prior to any load at all being put upon the threads at the center of the joint.

It is the general object of my invention to avoid and overcome the foregoing and other difficulties attending the manufacture and use of a threaded joint by providing a joint particularly adapted to resist axial pull, and in which all the individual thread convolutions are loaded throughout the entire length of the joint when the joint is put under relatively high axial tension.

Another object of my invention is to provide a threaded joint having a particularly high resistance to axial tension and in which the thread height and length can be retained at a minimum.

Another object of my invention is the provision of an improved method for cutting complementary threads on joint members.

Another object of my invention is the provision of an improved thread chaser and method of making it.

Another object of my invention is to provide a joint for oil well casing wherein the individual thread convolutions are all loaded when the joint is subjected to axial pull.

The foregoing and other objects of my invention are achieved by the provision of a threaded joint comprising mating male and female members, and complementary threads on the male and female members characterized by progressively greater flank clearances between the threads outwardly to one end of the joint. Stated another way, I provide a threaded joint having complementary threads of a modified Acme type and wherein the crests of the threads are of a constant width throughout the joint, and the roots of the threads are progressively wider outwardly of the thread run-outs.

In accordance with my invention, I provide a method of forming a threaded joint which includes the steps of cutting the mating threads so that the crests of the threads are of a constant width, and cutting the mating threads so that the roots thereof are progressively wider outwardly of the thread run-outs.

My invention further includes the provision of a thread chaser for cutting modified Acme-type threads, the chaser being cut by a single point tool, and wherein the thread roots of the chaser are of a constant width and the thread crests of the chaser are of a progressively greater width outwardly of the thread run-outs.

I provide a joint for oil well casing which is adapted to have high pull-out strength and which comprises threaded male and female members adapted to be screwed together, the threads of the members having flat crests and roots parallel to the joint axis and having substantially flat flanks positioned at an included angle of between about 0° and about 18°, usually between about 10° and 15°, the flank clearances between the individual thread convolutions being greatest at the ends of the joint and progressively smaller inwardly from the ends of the joint.

The threaded joint described in the preceding paragraph is made by a method which includes the steps of cutting the thread chasers with a single point tool guided by the thread profile but at a constant pitch, using the chasers to cut the mating threads so that the crests of the threads are of a constant width throughout the entire joint, including run-outs, and so that the roots of the threads are progressively wider outwardly of the thread run-outs. The "single point" tool referred to in the preceding sentence is a tool which cuts both the root and the flanks of a pair of adjacent thread convolutions.

Figure 9:
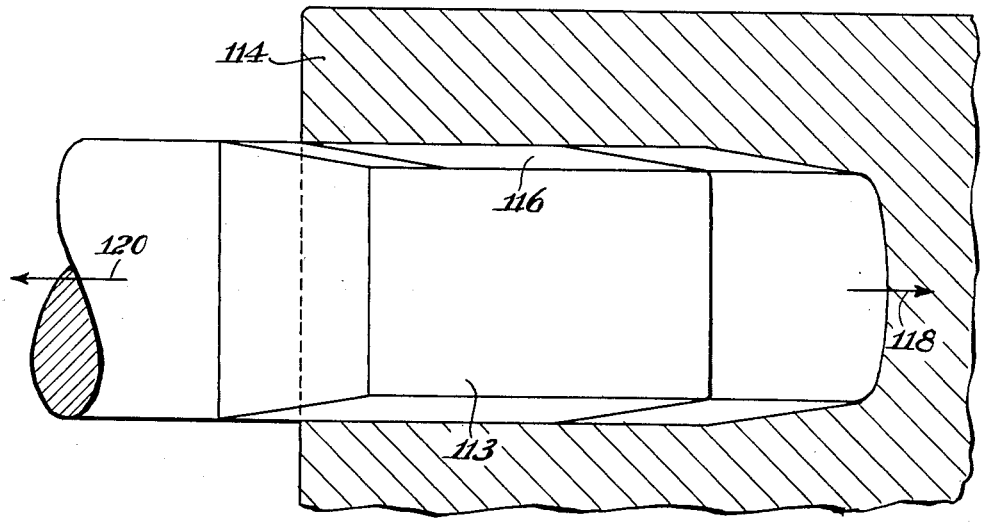

For a better understanding of my invention, reference should be had to the accompanying drawings in which Fig. 1 is a diagrammatic sectional view through a typical threaded joint constructed in accordance with prior art practices; Figs. 2 and 3 are diagrammatic cross sectional illustrations of the manner of forming my improved threaded joint; Fig. 4 is a cross sectional view of an unloaded threaded joint made from the male and female members of Figs. 3 and 2, respectively; Fig. 5 is a view similar to Fig. 4 but with the joint being illustrated as subjected to axial tension; Fig. 5A is a graphical representation of what is believed to be the probable loading of the joint shown in Fig. 5; Figs. 6 and 7 are similar to Figs. 2 and 3 but illustrate the formation of a tapered thread; Fig. 8 is a cross sectional view of a bolt and nut embodying the principles of my invention; and Fig. 9 is a view similar to Fig. 8 but shows a threaded connection between a socket and a bolt also incorporating the principles of my invention.

While my invention is broadly applicable to the provision of threaded joints of various kinds and for use in substantially any relation, my invention is particularly adapted to use in joining oil well casing or other tubular members which are subjected in use to relatively heavy pull-out stresses. An oil well casing joint must be capable of withstanding the tremendous loads of supporting a string of casing many thousands of feet long, and yet must be readily made up or taken apart and the joint itself must be of the smallest possible size so as to keep the size of the drilled hole at a minimum. Therefore, inasmuch as oil well casing joints are subjected to perhaps the most severe operating conditions, I have illustrated my invention as applied thereto in many of the figures of the drawings and will accordingly so describe my invention.

Referring particularly to Fig. 1 of the drawings, the numeral 10 indicates generally the female member of an oil well casing joint formed in accordance with standard American Petroleum Institute requirements. Received within the member 10 is a male member 12 which is formed with a V thread marked 14 that is complementary to a V thread marked 16 formed on the female member 10. When the joint shown in Fig. 1 is subjected to relatively high pull-out stresses the individual thread convolutions and the metal backing up the thread convolutions are deformed to substantially the engaging positions shown in Fig. 1. Thus, the flank clearances between the thread convolutions marked 14a and the complementary thread convolutions become progressively greater towards the end of the joint. Similarly, the thread convolutions marked 16a near the end of the female member 10 have progressively greater flank clearances with the opposed complementary thread convolutions of the male member 12. It should be understood that the flank clearances are the same and are substantially zero when the joint is under no axial load. It will also be seen that the sharply inclined flank surfaces of the thread convolutions have caused the end of the female member 10 to expand in a radial direction, at least near its end, and have further caused the male member 12 to contract radially, at least near its end.

Drawn as a part of Fig. 1 is a load distribution curve marked 18 which has as its ordinate the load in pounds per axial unit of thread, and as its abscissa the length of the thread with the abscissa being taken directly from the threaded length shown in Fig. 1. It will be seen from the curve 18 that the thread convolutions near the ends of the threaded joint are loaded to a much greater extent than the thread convolutions near the center of the joint. As a matter of fact, the load distribution curve 18 drops to zero at the center of the threaded length.

As distinguished from the type of load illustrated by the curve 18 and found in the standard threaded joint, I provide, in accordance with the principles of my invention, a loading of the individual thread convolutions of a threaded joint which is more nearly uniform throughout the full length of the joint than is the loading on an A. P. I. thread. This is achieved, as shown in Figs. 2 and 3, by cutting the thread chasers with a single point tool. Particularly having reference to Fig. 2, the numeral 20 indicates generally a thread chaser for cutting a female thread upon the end of a tubular female joint member 22. The type of thread cut by the chaser in the particular example of my invention illustrated is a modified Acme type having flat crests and roots parallel to the axis of the joint, and further comprising a cylindrical thread formed with tapered run-outs. The numeral 24 indicates a single point tool which is adapted to cut the thread chaser 20. The single point tool 24 is employed in conjunction with a profile plate and is advanced at a constant pitch marked P so as to cut the thread chaser 20 in the manner shown. Specifically, each of the roots of the threads cut on the chaser 20 is of a constant width W which is true of even those threads formed on the tapered run-out portions of the chaser.

Now when the thread of the chaser is employed to cut the thread on the female joint member 22 it will be recognized that each of the thread convolutions formed on the female joint member 22 has a crest of a constant width marked W. The roots of the threads at the small or pipe end of the female member 22, which are defined by the conical run-out surface 26, are of progressively greater width, all of which is in accordance with standard practice. In other words, the thread convolutions defined by the conical surface 26 are all perfect threads. However, the thread convolutions defined by the conical run-out surface 28 are not perfect threads. In these thread convolutions instead of having the roots of the threads of a constant width with the thread crests being chopped off to provide new thread crests of progressively greater width outwardly of the threaded length, the relation of the crests and roots is just reversed. The width of the thread crests remains the distance W, whereas the width of the roots changes from the standard distance Y to the distances $Y+X'$ and $Y+X'+Z'$. It will be seen that the distance $X'$ is equal to the horizontal distance between the base corners marked 30 of the actual thread convolutions and the base corners marked 32 of the normal thread base. Similarly, the distance marked $Z'$ is equal to the horizontal distance between the actual base corner 34 of the thread convolution and the base corner 36 of the normal thread base.

The thread chaser used for cutting the thread on the male pipe end is made in a similar manner. Specifically, the numeral 40 indicates as a whole a thread chaser adapted for cutting the thread on the end of a male pipe joint member 42. The chaser 40 is cut by a single point tool 44 which is employed in conjunction with a profile plate and which is advanced at a constant pitch marked P so as to form the thread chaser 40 in the manner shown. Specifically, each of the roots of the threads cut on the chaser 40 is of a constant width W which is true of even those threads formed on the tapered run-out portions.

Now when the chaser is employed to cut the thread on the male joint member 42 it will be recognized that each of the thread convolutions formed on the male joint member has a crest of a constant width marked W. The roots of the thread at the large or pipe end of the male joint member 42, which are defined by a conical run-out surface 46 are of progressively greater width, all of which is in accordance with standard practice. In other words, the thread convolutions defined by the conical portion 46 are all perfect threads. However, the thread convolutions defined by the conical run-out surface 48 are not perfect threads. In these thread convolutions instead of having the roots of the thread of a constant width with the thread crests being chopped off to provide new crests of greater width outwardly of the threaded length, the relation of the crests and roots is just reversed. The width of the thread crests remains the distance W, whereas the width of the roots changes from the standard distance Y to the distances $Y+X$ and $Y+X+Z$. It will be seen that that distance X is equal to the horizontal distance between the base corners marked 50 of the actual thread convolutions and the base corners marked 52 of the normal thread base. Similarly, the distance marked Z is equal to the horizontal distance between the actual base corner 54 of the thread convolution and the base corner 56 of the normal thread base.

When the female joint member 22 is threaded upon the male joint member 42 after being cut with threaded convolutions as just described, it will be recognized that the perfect threads defined by the conical surface 26 on the female member engage with the imperfect threads defined by the conical surface 48 on the male joint member. Also, the perfect threads defined by the conical surface 46 on the male member engage with the imperfect threads defined by the conical surface 28 on the female member. The result is as diagrammatically illustrated in Fig. 4 of the drawings wherein the male and female joint members 42 and 22, respectively, are shown threaded together but without being subjected to any axial pull. From this figure of the drawings it will be recognized that the perfect threads at the center of the joint are defined by cylindrical surfaces and have a substantially uniform flank clearance. However, those portions of the complementary threads which are defined by conical or tapered surfaces have progressively wider clearances between complementary flank surfaces. At one end of the thread such progressively greater clearances are indicated by the numerals 60 and 62, whereas at the other end of the thread such clearances are indicated by the numerals 64, 66 and 68.

Referring now to Fig. 5 the relation of the flank clearances is clearly illustrated when the joint is subjected to axial pull. It will be understood that Fig. 5 is a view of exactly the same joint in cross section as that of Fig. 4, but that in Fig. 5 the joint members have been illustrated in the positions they occupy when the joint is subjected to relatively heavy axial tension, as, for example, when the joint is used to connect oil well casing end to end and the joint is near the top of a relatively long string of casing supported in an oil well. From Fig. 5 it will be recognized that the pipe end of the male joint member 42 has been stretched to bring the flank surfaces of the threads defined by the conical or tapered run-out into engagement with the flank surfaces of complementary threads. However, before such complementary flank surfaces can be brought into load-bearing engagement it is necessary that the contacting flank surfaces and whole perfect threads at the center of the joint act to carry at least part of the load. Similarly, the small or pipe end of the female joint member 22 has been stretched to bring the flank surfaces of the threads defined by the conical or tapered run-out of the thread into load-bearing engagement with each other. This load-bearing engagement of the threaded convolutions in the region of the tapered run-out will not occur until at least part of the load has been assumed by the whole perfect threads at the center of the joint and such threads have been deformed.

The result of the loading of the joint under axial tension is graphically illustrated in Fig. 5A by the lines 70, 71 and 72 whose ordinates represent the load in pounds and whose abscissas represent the length of the thread as taken directly from the thread length shown in Fig. 5. The line 70 indicates the stress distribution on the joint under light loads; the line 71 indicates the stress distribution under medium loads; and the line 72 the distribution under heavy loads. It will be understood that it is a difficult thing to determine the exact loading on the individual threads but that graphically illustrated and just explained is believed to be correct. Having particularly to do with loading, at the extreme end of the thread engagement the thread height is zero so, of course, the threads could take no load. However, the thread height builds up quite rapidly so that close to the end of the threaded engagement the threads will take some load, although these shallow threads can not be expected to take nearly as much load as the full threads near the center of the joint.

An advantage of the progressively increasing clearance is that the clearance can be made sufficiently large at the ends of threaded engagement so that the end threads never have to take much, if any, of the load. That is, the joint will fail or be close to failure through a male or female root before these flanks engage. Without this flank clearance at the end of threaded engagement a joint of this type is comparatively weak because even light tension loads will cause the shallow end threads to slip past each other and in so doing wedge the members apart. This progressive wedging action follows around the thread and causes the joint to fail by pull-out or fracture at lower values of tension load than occur with my improved joint.

It will be understood in conjunction with the foregoing explanation of the loading of the individual threads of a threaded joint that the individual thread convolutions, as well as the metal backing the threads, is deformed elastically when subjected to stress. Further, considerable plastic deformation is necessary both in the threads and the backup metal to bring the flanks of the threads near the end of the joint into engagement. This is not objectionable, however, but is as it should be. A joint in which the end flanks engaged with only elastic deformation would be of little worth. The invention is chiefly concerned with high joint strength for emergency loads. The joint must be several times as strong as is necessary for ordinary service. The fact that the joint deforms plastically under emergency loads is not considered objectionable but is to be expected. For example, the main thing in an emergency involving oil well casing is usually to get the string out of the hole and it is highly desirable to have high strength joints regardless of their condition afterwards.

The basic principles of my invention have been explained in detail in conjunction with Figs. 2 to 5 of the application drawings, which show a cylindrical thread having tapered run-outs. However, it should be expressly understood that my invention is applicable for use in conjunction with various thread forms and in this connection reference should be had to Figs. 6 and 7 which show the manner of forming a tapered threaded joint. Specifically referring to Fig. 6, the numeral 74 indicates the end of a female joint member and the numeral 76 indicates a tap chaser for cutting the threads on the female member. The threads are to be cut on a taper in the manner particularly shown. The tap chaser 76 is cut with a single point tool 78 guided by a profile plate and it will therefore be seen that the width of the roots of the thread convolutions at the point 80 is equal to the width of the thread convolutions at the point 82. Therefore, the crests of the thread convolutions cut at 82' on the female joint member are the same as the width of the crests cut at the point 80' on the female member. For perfect run-out threads the crests should become progressively wider toward the pipe end of the female member. As the crests are all of the same width the roots therefore become progressively wider toward the small or pipe end of the female joint member 74. The threads at the point 84 are truncated perfect threads.

With respect to Fig. 7, the numeral 86 indicates a male joint member having a tapered thread cut thereon by a die chaser 88. The die chaser 88 is cut with a single point tool 90 defined and guided by a tapered profile plate on the usual thread-cutting lathe. The root of the thread of the chaser at the point 92 is the same as the root on the chaser at the point 94. Therefore, the crests of the pipe at point 92' are the same as the crests of the pipe at the point 94'. For perfect run-out threads the crests of the pipe at 92' should become progressively wider toward the pipe or large end of the male joint member. However, the crests are all of the same width. Therefore the roots become progressively wider than perfect toward the large or pipe end of the joint member 86. At the point 96 the threads of the male joint member are perfect.

The imperfect threads at the point 92' of the male joint member 86 mate with the perfect threads on the outer or large end of the female joint member 74, thus providing progressively greater flank clearances toward the pipe end of the male joint member 86. The imperfect threads at 82' on the female member 74 mate with the perfect threads at 96, thus providing progressively greater flank clearances toward the small or outer end of the male joint member 86.

While the principles of my invention are particularly adapted to use in conjunction with threaded joints for oil well casing they are also applicable broadly to any threaded joint. Furthermore, while substantially all of the threaded joints herein illustrated and described are joints of the modified Acme type, the principles of my invention can also be utilized in conjunction with threads of other forms. More particularly, I have illustrated in Figs. 8 and 9 the use of my invention in conjunction with threaded joints other than oil well casing and employing any desired thread form. More specifically, in Fig. 8 the numeral 100 indicates a threaded bolt which removably receives a nut 102 which holds the bolt against movement through an aperture plate 104. The plate 104 is held against movement by a force acting in the direction of and indicated by the arrow 106. The bolt 100 is pulled by a force in the direction of and indicated by the arrow 108. Now, in accordance with my invention the threaded connection between the nut 102 and bolt 100, which connection is indicated as a whole by the numeral 110, is formed with a tapered run-out portion 112 in which the flank clearances between the threads become progressively greater outwardly to the end of the threaded length when the thread is not loaded. When the load is applied it will be understood that the deformation of the threads and backing metal causes the flank surfaces of the various thread convolutions to engage so that the load is carried over the entire threaded length.

In Fig. 9 I have shown a threaded bolt 113 removably received in a threaded socket 114. The threaded connection indicated as a whole by the numeral 116 between the socket 114 and bolt 113 is, in accordance with my invention, formed with tapered thread run-outs having progressively greater flank clearances. Thus, when the socket and bolt are subjected to individual axial forces acting in the direction of the arrows 118 and 120 the individual thread convolutions of the threaded connection 116 all carry a part of the load as heretofore described.

It will be understood that the particular thread clearances illustrated in the several figures of the drawings have been greatly exaggerated to diagrammatically illustrate the principles of my invention. In actual practice the thread clearances and the flank clearances herein particularly considered are relatively small. Moreover, the tapers defining the thread run-outs have likewise been exaggerated and the number of thread teeth has been reduced and the thread size increased to further illustrate the invention. In actual practice the thread tapers are usually at a relatively small angle and often extend from the ends of the threaded joints to a point or points closer to the center of the threaded joints. The number of thread convolutions per inch is greatly increased and the thread size is reduced.

From the foregoing it will be recognized that the objects of my invention have been achieved by the provision of an improved threaded joint particularly adapted to resist axial pull and in which the individual thread convolutions are more uniformly loaded than heretofore. My improved threaded joint can be cut quickly and simply by a thread chaser which is in turn readily formed. My improved joint is particularly adapted for use in conjunction with oil well casing but can be employed in substantially any other relation wherein great strength in axial pull is required. Substantially any particular thread form can be improved to possess greater resistance to axial tension, and this is particularly true of an Acme-type thread. Premature failure of certain of the convolutions of a threaded joint by plastic deformation is substantially prevented. Further, radially directed compression and expansion stresses are reduced as they are a function of the small included flank angle. Thus, by making the flank angle less than the friction angle, the radial deformation is eliminated because the forces of friction do not permit the surfaces to move with respect to each other.

While in accordance with the patent statutes I have illustrated and described my invention in detail, it should be expressly understood that my invention is not to be limited thereto or thereby but is defined in the appended claims.

I claim:

1. A threaded joint having complementary threads of a modified Acme type and wherein the crests of the threads are of a constant width throughout the joint and the roots of the threads are progressively wider outwardly of the thread run-outs.

2. A threaded joint having complementary threads of the Acme type cut on a constant pitch and wherein the crests of the threads are of a constant width throughout the joint and the roots of the threads are progressively wider outwardly of the thread run-outs, so that when the joint is subjected to axial pull the flank surfaces of the threads engage so that all of the thread convolutions are loaded except at the very ends of the thread.

3. A thread chaser for cutting a modified Acme-type thread, said chaser having thread teeth cut thereon on a constant pitch, the said thread teeth having roots of a constant width and crests of a progressively greater width outwardly of the thread run-outs.

4. A joint for oil well casing and adapted to have high pull-out strength which comprises threaded male and female members adapted to be screwed together, the threads of the members having substantially flat crests and roots parallel to the joint axis and having substantially flat flanks positioned at an included angle of between about 0° and about 18°, the flank clearances between the individual thread convolutions being greatest at the ends of the joint and progressively smaller inwardly from the ends of the joint for at least a portion of the threaded length.

WILLIAM M. FRAME.